United States Patent [19]

Jackson

[11] Patent Number: 4,483,048

[45] Date of Patent: Nov. 20, 1984

[54] FISH SKINNING TOOL

[76] Inventor: Leroy H. Jackson, Rte. 1, Falkner, Miss. 38629

[21] Appl. No.: 533,304

[22] Filed: Sep. 19, 1983

[51] Int. Cl.³ .............................................. A22C 25/17
[52] U.S. Cl. ........................................... 17/68; 17/69
[58] Field of Search .......................... 17/50, 66, 68, 69; 30/175, 191

[56] References Cited

U.S. PATENT DOCUMENTS 2,654,120 10/1953 Tifft .
3,088,165 5/1963 Bellis .
3,163,885 1/1965 Dumas et al. .
3,414,935 12/1968 Senna ..................................... 17/69
3,771,197 11/1973 Heuer, Sr. .

OTHER PUBLICATIONS

"Catfish Farming . . . a Reference Unit", by Jasper S. Lee, 1971.

Primary Examiner—Willie G. Abercrombie
Attorney, Agent, or Firm—Henderson & Sturm

[57] ABSTRACT

A combination fish skin cutting and grasping tool which has a cutting edge formed in one piece and integral with one of the jaws thereof and furthermore has a projection thereon for limiting the depth of the cutting so as to prevent damage to the meat of the skin while at the same time insuring that a clean cut of the skin will be made. The combination skin cutting and grasping device prevents the need to use separate tools and to switch from one to the other, thereby making the job of removing skin from fish much more efficient.

4 Claims, 4 Drawing Figures

FISH SKINNING TOOL

TECHNICAL FIELD

This present invention relates to a fish skinning tool and more particularly to such a tool which is a combination of a cutter and of pinchers for grasping the skin of fish.

BACKGROUND ART

In the skinning of fish, for example such as catfish, it is necessary to first cut the skin at certain places and then to grasp the skin at such cut edges and pull it off of the meat. The common way to solve this problem is to use a knife to do the cutting and pliers or pinchers for grasping the skin and pulling it off of the meat. This procedure becomes a tedious one because it requires the use of one tool and then the other; and this switching back from one tool to the other is very time consuming.

Various attempts have been made to produce a combination cutter and skin grasping tool. For example, U.S. Pat. No. 3,088,165 to Bellis, U.S. Pat. No. 2,654,120 to Tifft and U.S. Pat. No. 3,711,197 to Heuer show three examples of attempts to produce such a tool. While the problem has been solved to one degree or another by these patents, still none of the attempts to have a combination pincher and cutter have been commercially successful. It is theorized that prior attempts to produce such a combination tool have been too clumsy, bulky and difficult to use. Furthermore, the cutters on aforementioned devices appear to be too long and therefore cut too deeply into the meat of such fish being dressed.

Accordingly, there appears to be a need for an improved combination pincher and cutter which will overcome the problems mentioned above.

DISCLOSURE OF THE INVENTION

The present invention relates to a combination skin cutting and skin grasping tool which has a cutting edge formed in one piece and integral with one of the jaws thereof and has a projection thereon for limiting the depth of the cutting so as to prevent damage to the meat of the fish while at the same time insuring that a clean cut of the skin will be made. The combination skin cutting and grasping device prevents the need to use separate tools and to switch from one to the other, thereby making the job of removing skin from fish much more efficient.

An object of the present invention is to provide an improved tool for cleaning fish.

Another object of the invention is to provide a combination cutter and grasping tool for the skin of fish.

Still another object of the invention is to provide a combination tool the type defined above which prevents the meat of the fish from being cut up while at the same time insures that the skin will be cut completely.

Still further object of the invention is to provide a tool of the type mentioned above, which is safe to use.

Other objects, advantages, and novel features of the present invention will become apparent from the following detailed description of the invention when considered in conjunction with the accompanying drawings.

BEST MODE FOR CARRYING OUT THE INVENTION

Figure 1:
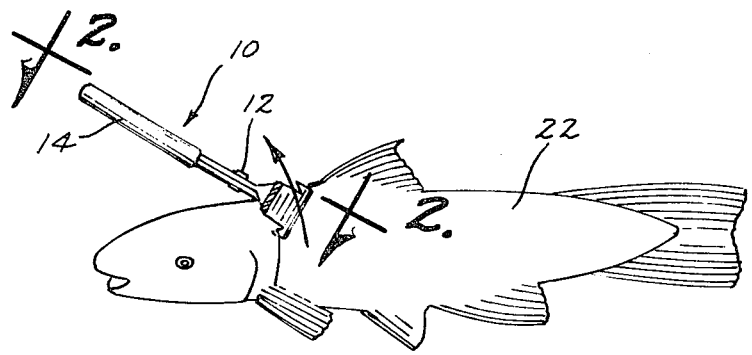
FIG. 1 shows a perspective view of the present invention being utilized to make a required cut on a catfish being dressed.
Figure 2:
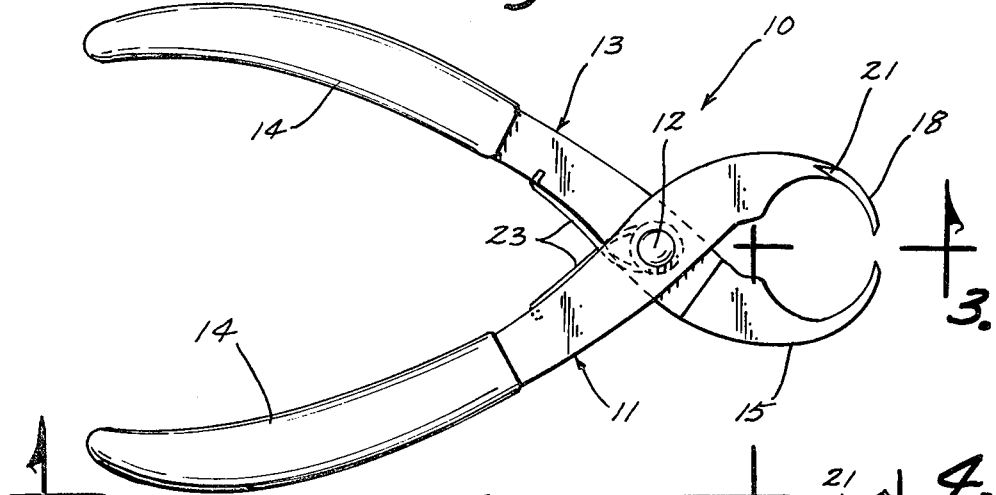
FIG. 2 is a side elevational view of the present invention.
Figure 3:
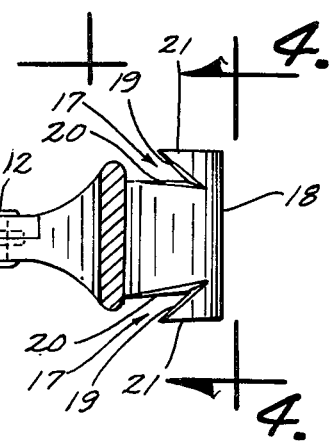
FIG. 3 is a cross-sectional view taken along line 3—3 of FIG. 2.

Referring now to the drawings wherein like reference numerals designated identical corresponding parts throughout the several views, FIG. 1 shows a combination fish skin cutting and grasping tool (10) constructed in accordance with the present invention. FIG. 2 shows tool (10) which includes a first elongated member (11) pivotally attached by means of a rivet (12) to a second elongated member (13). Plastic handle grips (14) are slideably disposed in a very snug fit to the handle on the members (11) and (13) for preventing slippage when the tool (10) is used.

A jaw member (15) is disposed on the front end of elongated member (13) and extends inwardly to a beveled edge (16) on the extreme end thereof. The other elongated member (11) is substantially identical to the elongated member (13) except that notches (17) have been formed in a jaw member (18) and beveled edges (19) and (20) are formed on each side of the notch (17) for providing a cutting action. A projection (21) is thereby formed and the depth of the notch (17) is preferably no greater than one-quarter of an inch long so that the projection (21) will not extend too deeply into the meat of the fish, but will instead mainly just cut the skin and not cut any of the meat on the fish.

In operation, the catfish (22) shown in FIG. 1 can be easily cleaned by utilizing the tool (10) by first causing one of the projections (21) to extend into the fish and utilizing the cutting surface (19) to make whatever separations in the skin of the fish that are desirable. For example, a cut as shown in FIG. 1 is always used and, similarly, cuts along the edges of the fins and tail of fish may be desirable as well to be able to pull skin off of fish easily. Once the desired separations of the skin have been made so as to outline the portion of the skin to be removed, then the beveled edges (16) are utilized to grasp one edge of such piece of skin and such skin is held firmly between the beveled edges (16) by grasping firmly the handles (14). Then such piece of skin, so defined, can be easily pulled off of the fish.

After the fish has been skinned, the projection (21) is inserted into one end of fish's stomach, preferably up by the head of the fish, and then the tool is utilized to pull back the entire length of the stomach. Because the projection (21) is about one-fourth of an inch, the stomach wall will be cut by such action without cutting the intestines of the fish, thereby making the cleaning out of the intestines a much cleaner and efficient job.

Figure 4:
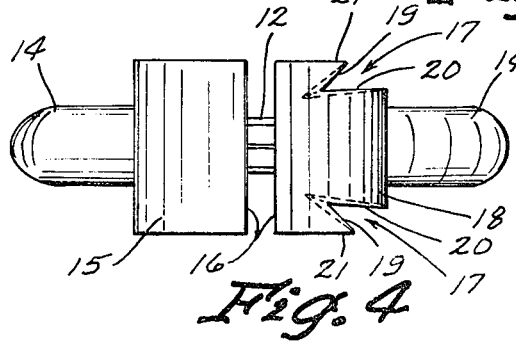
FIG. 4 is a front view taken along line 4—4 of FIG. 3.

The spring (23), as shown clearly in FIG. 2, is wrapped around the rivet (12) and has one end extending over the elongated member (11) and the other end extending over elongated member (13) whereby the handle members (14) are held apart and likewise the beveled edges (16) are held apart in the position shown in FIGS. 2 and 4. Consequently, the tool (10) is ready to either cut or grasp the skin at any time. Therefore, this tool is much more efficient than any tool heretofore devised for this purpose.

Obviously many modifications and variations of the present invention are possible in light of the above teachings. It is therefore to be understood that, within the scope of the appended claims, the invention may be practiced otherwise than as specifically described.

I claim:

1. A fish skinning tool comprising a pair of elongated members pivotally interconnected intermediate their ends and having hand grips at one end thereof and jaw members at the other end thereof, each of said jaw members including an inwardly directed curved outer end portion terminating in a beveled edge thereon, the beveled edges of said outer end portions being directed towards each other and movable between a first relative position wherein said beveled edges are in contact with each other and a second relative position wherein said beveled edges are spaced substantially apart at least enough to receive a fish skin therebetween, the improvement comprising: cutting means integrally formed in one piece with at least one of said jaw members, said cutting means comprising a notch in the side of said one jaw member at a place spaced from said beveled edge, said notch being defined by the space formed between a rearwardly extending projection having the inner edge thereof sharpened for cutting fish skin and an inner edge of said one jaw means connected to said sharpened inner edge.

2. The fish skinning tool of claim 1 wherein said inner edge of said one jaw means is sharpened for cutting.

3. The fish skinning tool of claim 2 wherein inner edge of said one jaw member is generally transversely disposed with respect to the pivotal axis of said elongated members and said inner edge of said projection being disposed at generally a 45° angle with respect to said pivotal axis.

4. The fish skinning tool of claim 2 including a second cutting means disposed on the other side of said one jaw means, whereby said one jaw member is substantially symmetrical in shape.

* * * * *